United States Patent [19]

Battrick

[11] 3,787,639

[45] Jan. 22, 1974

[54] PUSHBUTTON ELECTRONIC PULSING DIAL

[75] Inventor: Peter Edward Battrick, Ottawa, Ontario, Canada

[73] Assignee: Northern Electric Company Limited, Montreal, Quebec, Canada

[22] Filed: Nov. 16, 1972

[21] Appl. No.: 307,064

[52] U.S. Cl. .............................................. 179/90 K
[51] Int. Cl. ............................................ H04m 1/30
[58] Field of Search ............ 179/90 B, 90 BB, 90 K

[56] References Cited

UNITED STATES PATENTS 3,601,552 8/1971 Barnaby et al. .................. 179/90 B

*Primary Examiner*—Kathleen H. Claffy
*Assistant Examiner*—G. Brigance
*Attorney, Agent, or Firm*—John E. Mowle

[57] ABSTRACT

An electronic pushbutton dial, which generates dial pulse type signals on a telephone line in response to a digit selected on a pushbutton pad, for signalling step-by-step switching offices. The digit selected is coded and stored in a non-destructive read-write memory and is subsequently loaded into a presettable counter. A pulse generator is arranged to generate and feed dial-pulse-timing signals simultaneously into the presettable counter and to a solid state switch which is in series with the telephone line. The digit selected is transmitted to the central office by interrupting the telephone line current at the dial-pulse-timing signal rate until the count in the presettable counter reaches a predetermined value. The interdigit interval is generated by loading a fixed number into the presettable counter and feeding dial-pulse-timing signals into the presettable counter, while disabling the solid state switch, until the count in the presettable counter again reaches said predetermined value.

14 Claims, 6 Drawing Figures

PUSHBUTTON ELECTRONIC PULSING DIAL

FIELD OF THE INVENTION

This invention relates to telephone station dialling apparatus and more particularly to a pushbutton dial which can be used by a subscriber serviced by a telephone central office which is not equipped to receive TOUCH-TONE or DIGITONE signals from a subscriber line.

DESCRIPTION OF THE PRIOR ART

In many towns and cities old, but serviceable, central office plant is frequently encountered which, for reasons which are largely economic, has not been replaced by more modern switching equipment. The recent popularity of TOUCH-TONE and DIGITONE dialling has created a demand for this service by subscribers in areas serviced by the older central office plant. To meet this demand telephone companies generally assign, to subscribers wishing this service, telephone lines which are supplied at the central office with suitable translating equipment to convert the DIGITONE signals received from the subscriber set into dial pulse type signals which are readily handled by step-by-step switching offices.

Until recently the cost, bulk, and power requirements of the translating equipment has almost universally required its placement in the central office where it could be shared by several lines, housed, and provided with necessary operating potentials.

Recent advances in solid state technology have led to the development of a compact, low cost translator with low power requirements which can be conveniently housed in a subscriber telephone set. One requirement of the translator equipment is that it have a memory, in order that it be able to accept digits selected at a relatively high rate of speed on a pushbutton pad and output the required rotary dial type pulses at a slower pulse rate acceptable by the existing central office equipment.

The need for a memory can be turned to advantage however by providing a re-dial feature wherein the digits dialled or the number stored in the memory can be re-transmitted to the central office by simply actuating a button provided for this purpose.

SUMMARY OF THE INVENTION

It has been found that the extremely low power requirements of complementary MOS structures, their high degree of integratability, high noise immunity, operating temperature range and tolerance to supply voltage variations has made practical the economic design of a translator or digit generator which can be conveniently packaged and supplied with operating potentials within the subscriber telephone set.

Thus in accordance with the present invention the translator or digit generator for generating dial pulses on a telephone line in response to a digit selected on a pushbutton pad at a telephone station set comprises a non-destructive read-write memory with cooperating read address and write address registers. A means is provided for coding and loading a digit selected on the pushbutton pad into the memory at an address stored in the write address register, and a presettable counter having a plurality of counter stages, is arranged to accept data from the memory in response to a read signal. To suitably interlace the read and write functions, a read-write interlace means, responsive to a difference in the address stored in the read address register and the address stored in the write address register, generates a read signal when no digit is being selected or dialled on the pushbutton pad. Additionally provided are a means for generating a first enable signal in response to a difference in the state of at least one of the presettable counter stages, and a means, responsive to every occurrence of the first enable signal, for gating dial-pulse-timing signals, generated by a pulse generator, into the presettable counter. A dial pulse generating means, responsive to dial-pulse-timing signals and to odd numbered occurrences of the first enable signal, is used to generate dial pulses on the telephone line, whereafter, means responsive to even numbered occurrences of the first enable signal is used, to load a fixed data word into the presettable counter, and to inhibit the dial pulse generating means. With the aforementioned combination of means and elements the digit selected on the pushbutton pad is generated by interrupting the telephone line current at the dial-pulse-timing signal rate as dial-pulse-timing signals are fed into the presettable counter until all the presettable counter stages reach the same state; and the interdigit pause is provided by loading the presettable counter with the fixed data word to generate an even numbered occurrence of the first enable signal and gate dial-pulse-timing signals into the presettable counter until all of the presettable counter stages reach the same state.

BRIEF DESCRIPTION OF THE DRAWINGS

An embodiment of the invention will now be described with reference to the accompanying drawings in which.

DESCRIPTION OF THE PREFERRED EMBODIMENT

Figure 1:
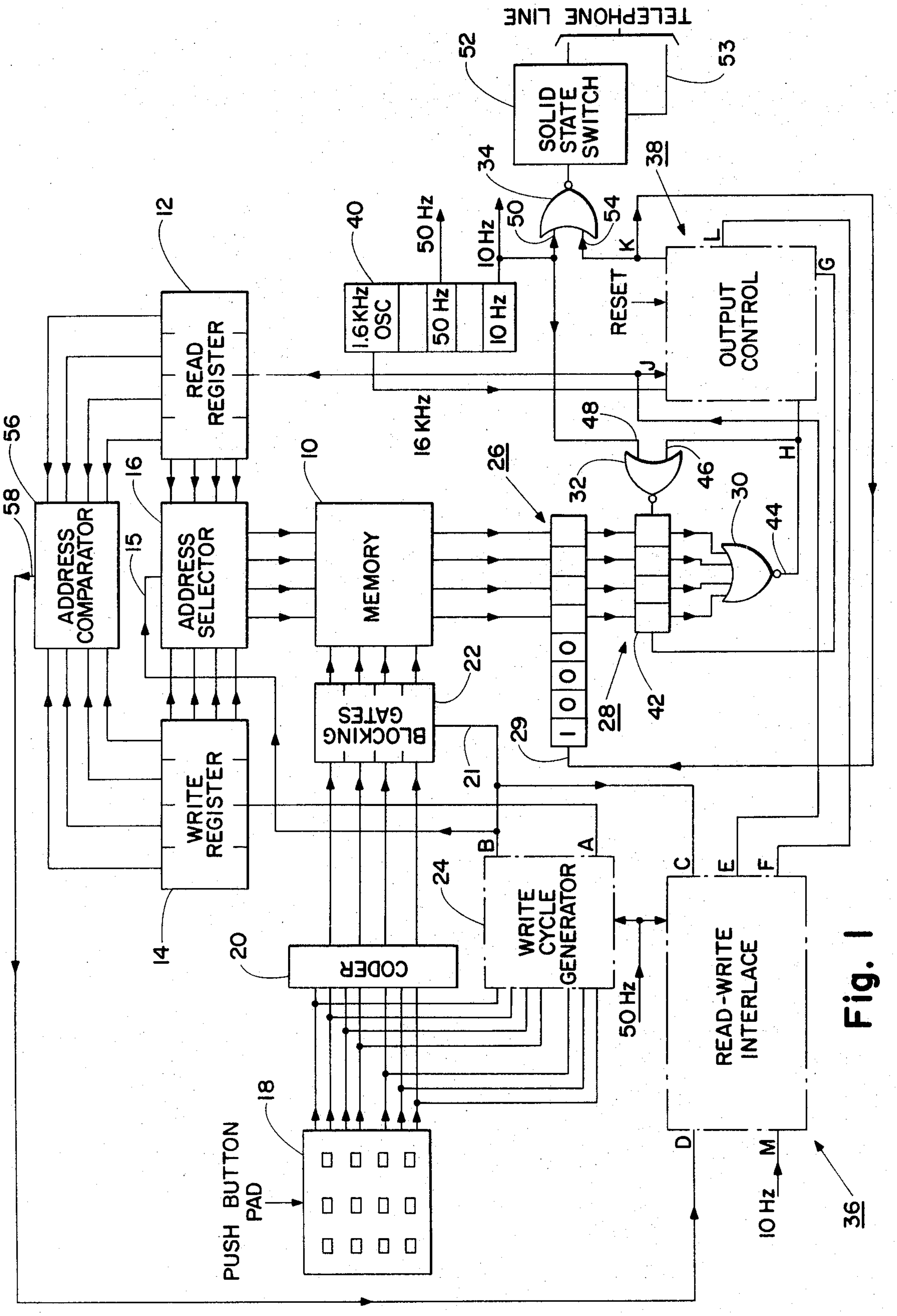
FIG. 1 is a simplified schematic block diagram of the pushbutton electronic pulsing dial or digit generator.

With reference to FIG. 1 the portions of the digit generator circuitry which came into play in the write mode are the memory 10, write address register 14, address selector 16, pushbutton pad 18, coder 20, blocking gates 22 and write cycle generator 24. The pushbutton pad 18, which is fundamentally a 3 × 4 contact matrix with three horizontal rows of pushbuttons and four vertical columns of pushbuttons presents seven appearances to the coder 20 and to the write cycle generator 24. Contact closures among the seven input appearances at the coder 20 are coded into binary coded decimal (BCD) form by the coder 20 and the resulting binary signal levels are transmitted to the blocking gate 22.

The aforementioned seven appearances at the write cycle generator 24 are responsible for the generation of enable signals at output terminals A and B of the write cycle generator 24. The enable signal appearing at output terminal B of the write cycle generator 24, appears at the input terminal 15 of the address selector 16 and at the control terminal 21 of the blocking gates 22, while the signal appearing at the output terminal A of the write cycle generator 24 appears at the write address register 14.

The aforementioned write address register 14, and the read address register 12 which will be considered later, are essentially four stage counters while the address selector 16 is essentially an electronic four pole transfer switch which normally completes a path from the read address register 12 to the memory 10.

When an enable signal appears at output terminal B of the write cycle generator 24, the address selector 16 is switched to complete a path from the write address register 14 to the memory 10 and the blocking gates 22 are enabled by control terminal 21 to permit BCD data from the coder 20 to be stored in the memory 10 at the address stored in the write address register 14. Once the coded data corresponding to the digit selected (also commonly referred to as dialled) on the matrix or pushbutton pad has been stored in the memory 10, the trailing edge of a signal appearing at output terminal A changes the write address by incrementing by 1 the word stored in the four stage counter representing the write address register. A more detailed circuit of the write cycle generator 24 may be seen in FIG. 4.

Figure 4:
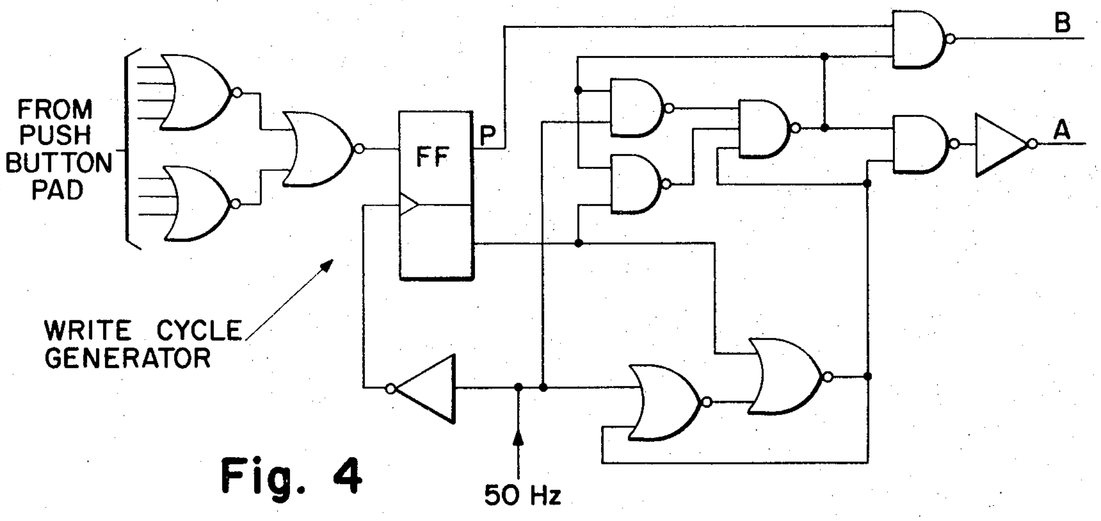
FIG. 4 is a more detailed schematic of the write cycle generator block shown in FIG. 1.

The seven appearances of the matrix or pushbutton pad at the write cycle generator 24 are divided into three horizontal inputs and four vertical inputs which are connected to a three input NOR gate and a four input NOR gate of the write cycle generator as shown in FIG. 4. The outputs of both of the aforementioned NOR gates are then connected through a dual input NOR gate to a 50Hz clocked flip-flop. Following the clocked flip-flop, additional logic circuitry, embodying the Boolean representation of the required function, is used to generate the required signals at output terminals A and B of the write cycle generator. The write cycle generator 24 is so designed that a logical one (1) signal appearing concurrently at one of its vertical and one of its horizontal input terminals during the write cycle will generate a logical 1 state at its output terminal A and a logical 0 state at its output terminal B.

Figure 5:
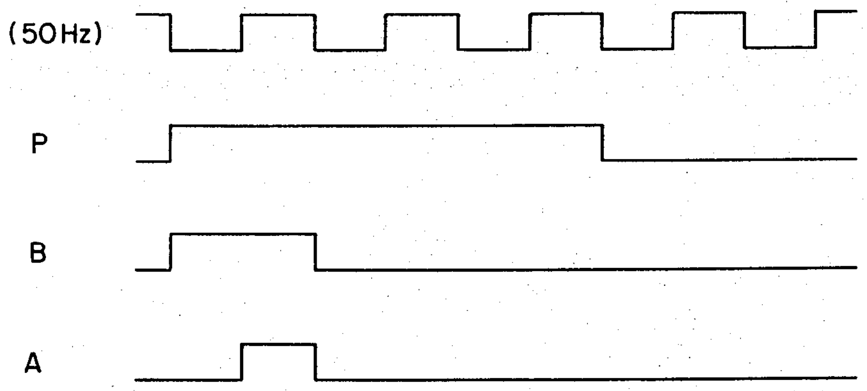
FIGS. 5 and 6 illustrate typical waveforms associated with the write cycle generator and the output control block respectively.

In the embodiment illustrated in FIG. 4, during the write cycle, the duration of the signals which appear at output terminals A and B of the write cycle generator 24 are one-half period and one complete period of the 50Hz signal respectively. These waveforms may be seen in FIG. 5. In FIG. 5 the waveforms shown have been designated alphabetically as A, B and P to correspond to their respective locations on FIG. 4. When the signal appearing at output terminal A drops to zero at the end of the write cycle (one period of the 50Hz signal) the address stored in the write address register is incremented by 1.

READ MODE

With reference to FIG. 1, the main functional blocks which carry out the read function of the digit generator are the read address register 12, output selector 26, presettable counter 28, four input NOR gate 30, first dual input NOR gate 32, second dual input NOR gate 34, read-write interlace block 36, output control bolck 38 and 1.6KHz clock 40 which also generates 50Hz and 10Hz signals.

Figure 2:
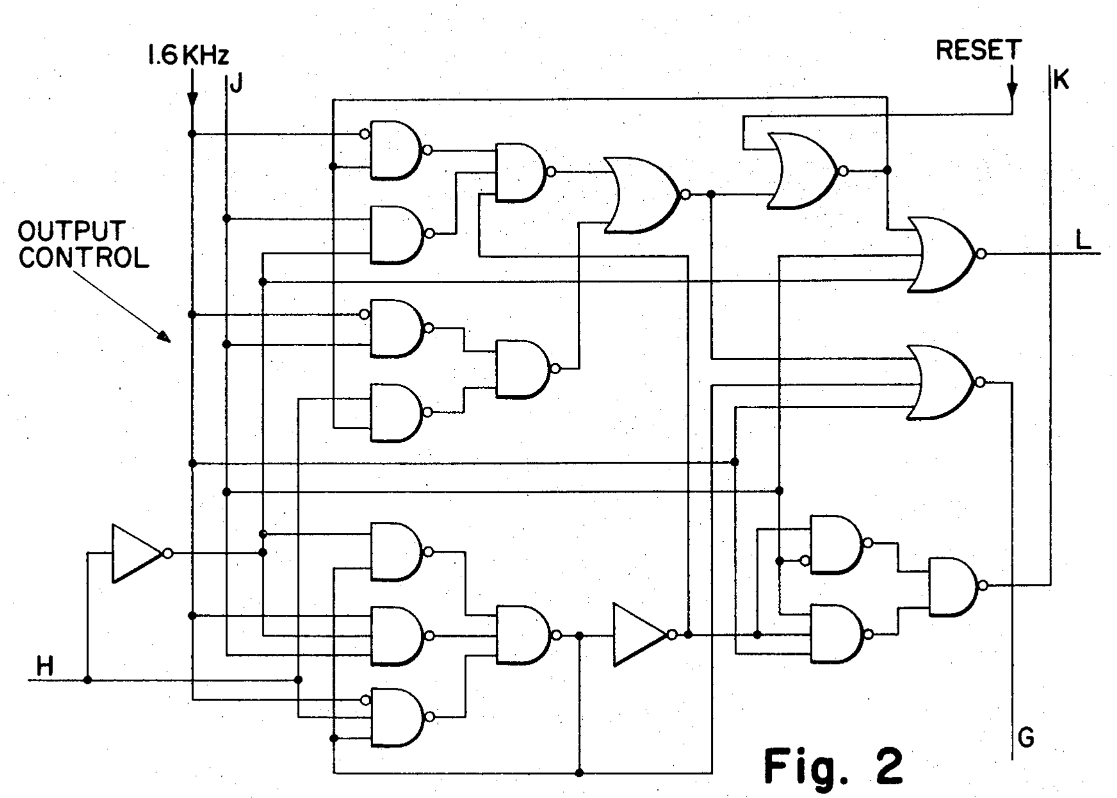
FIG. 2 is a more detailed schematic of the output control block shown in FIG. 1.
Figure 3:
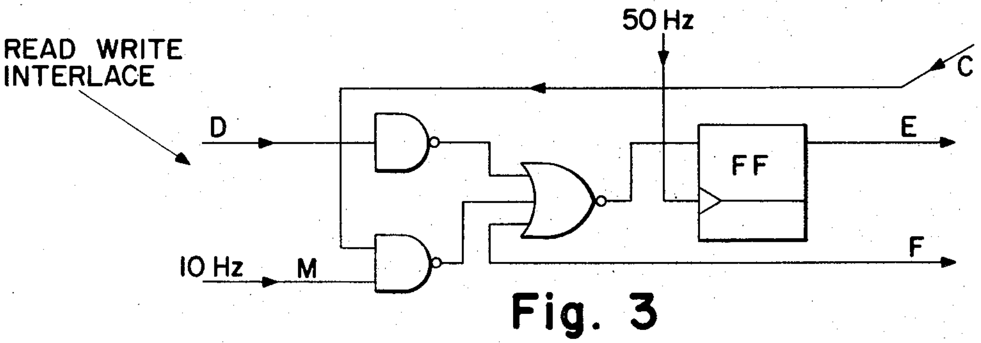
FIG. 3 is a more detailed schematic of the read-write interlace block shown in FIG. 1.

A more detailed representation of the read-write interlace block 36 and the output control block 38 may be seen in FIGS. 2 and 3 respectively.

With reference to FIG. 1 the functional blocks are arranged as follows. A four stage output selector 26 is connected to transmit data stored in the memory 10 at the address stored in the read address register, to the four stage presettable counter 28 unless a signal on the select lead 29 directs output selector 26 to transmit a fixed data word (binary 1000) to the presettable counter 28. Each stage of the presettable counter 28 corresponds to a particular stage of output selector 26. The presettable counter will not accept any data until a load signal is received at its input terminal 42. The four input NOR gate 30 has each of its inputs connected to a stage of the presettable counter in order to serve as a detector of an all zero (0) condition in the four stages of the presettable counter. The output terminal 44 of the four input NOR gate 30 is connected to input terminal H of the output control block 38 and to one input terminal 46 of first dual input NOR gate 32. The other input terminal 48 of the abovementioned first dual input NOR gate 32 along with one input terminal 50 of the second dual input NOR gate 34 are connected to the 10Hz signal output terminal 39 of the 1.6KHz clock 40. The 10Hz signal frequency is used to generate a series of dial-pulse-timing signals which are 62 milliseconds long and 38 milliseconds apart in time. These dial-pulse-timing signals approximate the dial pulses produced by standard mechanical rotary dials which are nominally 62 milliseconds long and 38 milliseconds apart.

By allowing a controlled member of dial-pulse-timing signals to pass via said one input terminal 50 of the second dual input NOR gate 34 to a solid state switch 52 or relay, which is in series with the telephone line 53, the telephone line current may be conveniently interrupted to transmit a pulse representation of the digit selected on the pushbutton pad 18 down the telephone line 53. The control of the second dual input NOR gate 34 resides with the other input terminal 54 of said gate which is connected to the output terminal K of the output control block 38.

Each stage of the four stage write address register 14 and each stage of the four stage read address register 12 is connected to an address comparator block 56 as shown in FIG. 1 of the drawings. The address comparator 56, which is simple and conventional in design, compares corresponding stages of the write address register 14 and the read address register 12 to determine whether the addresses stored in each of said registers are the same. As long as the aforementioned addresses differ, a sigal appears at output terminal 58 of the address register or at input terminal D of the read-write interlace circuit 36. Because both the read and write address registers contain the same member, or address data word, prior to dialling, and because the address data word stored in a particular register is incremented by 1, each time, after said particular register is called into service, a difference in the address data words stored can be interpreted as a signal that not all digits stored in the memory 10 have been read out.

The read-write interlace block 36, is connected to receive signals from the address comparator 56 at its input D, from the write cycle generator 24 at its input C, and from the output terminal L of the output control block 38 at its input F. When a try-to-read signal appears at input terminal F of the read-write interlace circuit 36 said interlace circuit 36 checks the signal appearing at its input terminal D from the address comparator 56 and the signal appearing at its input terminal C from the write cycle generator 24. If the address comparator 56 indicates that the read and write addresses are different and, if the write cycle generator 24 indicates that no digit is being selected on the pushbutton pad 18 at that instant, then a read signal will be generated at output terminal E of the read-write interlace block 36.

The read-write interlace block 36 as illustrated in FIG. 3 includes a single-input NAND gate, a dual input NAND gate, a three input NOR gate and a clocked (50Hz) flip-flop. If the write address register 14 and the read address register 12 contain different addresses the address comparator 56 will transmit a logical one (1) signal to input terminal D of the read-write interlace block 36. Furthermore when no digit is being dialled during a particular interval a logical (1) signal is transmitted from output terminal B of the write cycle generator 24 to input terminal C of the read-write interlace 36. During the positive half-cycles of the 10Hz signal in which input terminal M is also high (logical one (1)) both outputs of the NAND gates will be low (logical zero (0) state). Therefore, when a try-to-read signal (logical 0) appears at input terminal F of the read-write interlace block 36, and when the aforementioned conditions are met, all three input terminals of the three input NOR gate will be in their logical zero state and a logical one signal will appear at the output of the three input NOR gate. This logical one (1) signal will be clocked through the flip-flop by the 50Hz signal and will appear at output terminal E of the read-write interlace block 36 as a logical 1 or read signal.

The output control block 38 which is shown in greater schematic detail in FIG. 2 generates the try-to-read signal at its output terminal L and accepts a read signal at its input terminal J from the read-write interlace circuit 36. The output control block 38, also controls via its output terminal K, the second dual input NOR gate 34 which in turn controls the number of dial-pulse-timing signals sent to the solid state switch 52. Additionally the output control block 38 is responsible for generating a load signal for counter 28 on its output terminal G when a read signal appears at its input terminal J. The signal which appears at the output terminal K of the output control block 38 and at terminal 29 of the output selector 26 is also used to load the predetermined binary word (1000) into the presettable counter 28 in order to generate a 738 millisecond inter-digit pause while blocking the second dual input NOR gate 34. The time required for the presettable counter to count to 16 (binary 10000) from 8 (1000 binary) using a 10Hz signal with a 100 millisecond period is 738 milliseconds, this being 8 counts less 1 half cycle.

The presettable counter 28 is a four stage up counter as the object of each write operation is to load the inverse of the digit stored in the memory 10 into the presettable counter 28 and to feed dial-pulse-timing signals from the 10Hz generator into the presettable counter 28 via the first dual input NOR gate 32 until all stages of the presettable counter 28 return to their logical zero state. The output terminal 44 of the four input NOR gate 30 which monitors each stage of the presettable counter 28 is set to its logical zero state when the presettable counter 28 is loaded from the memory 10 and changes to its logical 1 state when all stages of the presettable counter 28 have been returned to their logical zero state. Each appearance of logical 0 at the output terminal 44 of the four input NOR gate 30 is defined as an occurrence of the first enable signal. The first and subsequent odd numbered occurrences of the first enable occur after the presettable counter has been loaded from the memory 10, the second and subsequent even numbered occurrences of the first enable occur after the presettable counter has been loaded with the fixed binary word (1000).

OPERATION OF THE PREFERRED EMBODIMENT

Write Mode

When a digit is selected on the pushbutton or matrix pad 18 the contact closure at the matrix pad is coded into BCD form by the coder 20 and a corresponding BCD signal appears at the blocking gates 22. In response to the aforementioned contact closure the write cycle generator 24 generates a signal on its output terminal B which directs the address selector 16 to call the write address register 14 into service in order that the digit selected can be stored in the memory 10 at the address stored in the write address register 14. When the write address register 14 has been called into service the blocking gates 22 are enabled and the digit selected is stored in the memory 10. After the digit selected has been stored in the memory 10 the trailing edge of the signal generated at output A of the write cycle generator 24 is used to increment the write address register by 1 in order that the next digit stored in the memory will be at a different address location.

Read Mode

If no digit is being selected on the pushbutton pad 18, and if the contents of the read address register 12 differ from the contents of the write address register 14, input terminals C and D of the read-write interlace block 36, which are respectively connected to output terminals B of the write cycle generator 24 and to the address comparator 56, will allow the read-write interlace block 36 to generate a read signal. This read signal will appear at output terminal E of the read-write interlace block 36, or equivalently at input terminal J of the output control block 38 if the aforementioned conditions are met when a try-to-read signal appears at input terminal F of the read-write interlace block 36. When the read signal appears at input terminal J of the output control block 38 a load signal is generated on output terminal G of the output control block 38 which loads the presettable counter 28 with the data stored in the memory 10 at the address location corresponding to the address stored in the read address register 12. When the presettable counter 28 is loaded from the memory 10 the output terminal 44 of the four input NOR gate 30 removes the first enable signal as it drops to its logical 0 state. The input terminal 46 of the first dual input NOR gate 32, which is connected to the outer terminal 44 of the four input NOR gate 30 also drops to its logical 0 state and in so doing allows dial-pulse-timing signals to pass from the 10Hz pulse generator into the presettable counter 28. As the dial-pulse-timing signals enter the presettable counter 28 a logical 0 level or second enable signal appears at output terminal K of the output control block 38 to enable said one input 54 of the second dual input NOR gate 34 and allow said dial-pulse-timing signals to trigger the solid state switch 52.

After the presettable counter 28 has counted a total of dial-pulse-timing signals equivalent to the numerical value of the digit to be transmitted along the telepone line, all four stages of the presettable counter 28 reach their logical 0 state and, as a result, the output terminal 44 of the four input NOR gate 30 rises to its logical 1 state. As soon as the output of the four input NOR gate 30 rises to its logitcl 1 state, which signifies the end of the first enable signal, further dial-pulse-timing signals are blocked from the presettable counter by the first dual input NOR gate 32, and the interdigit interval begins.

To prevent dial-pulse-timing signals from being transmitted along the telephone line during the interdigit interval a logical 1 signal is sent to said other input terminal 54 of the second dual input NOR gate 34 from output terminal K of the output control block 38. This logical one signal which also appears at output terminal K directs the output selector 26 to transmit the fixed data word (e.g. Binary 1000) to the presettable counter. When a load signal appears at input terminal 42 of the presettable counter 28 the fixed data word is loaded into the presettable counter and causes the output terminal 44 of the four input NOR gate 30 to drop to its logical 0 state and in so doing allows dial-pulse-timing signals to enter the presettable counter 28. This appearance of logical 0 at output terminal 44 is referred to as an even numbered occurrence of the first enable signal. After the presettable counter 28 has counted to binary 10,000 (decimal 16) all four stages of the presettable counter drop to their logical zero state and cause the output terminal 44 of the four input NOR gate 30 to rise to its logical one state. The return of output terminal 44, of the four input logic gate 30, to its logical one state, which signifies the end of said even numbered occurrence of the first enable signal, blocks the flow of dial-pulse-timing signals to the four stage presettable counter 28

The first and subsequent odd numbered occurrences of logical one at the output terminal 44 of the four input NOR gate 30 occur, after selected digits have been sent along the telephone line, and before the fixed data word corresponding to the interdigit pauses is set in the presettable counter. On the second and subsequent even numbered occurrences of logical one at the output terminal 44 of the four input NOR gate 30 which occur at the end of the interdigit intervals, the output control block 38 sends a try-to-read command from its output terminal L to input terminal F of the read-write interlace block 36 to initiate another read cycle. Note the aforementioned description refers to the logical one state and not the logical 0 state which is the first enable.

Figure 6:
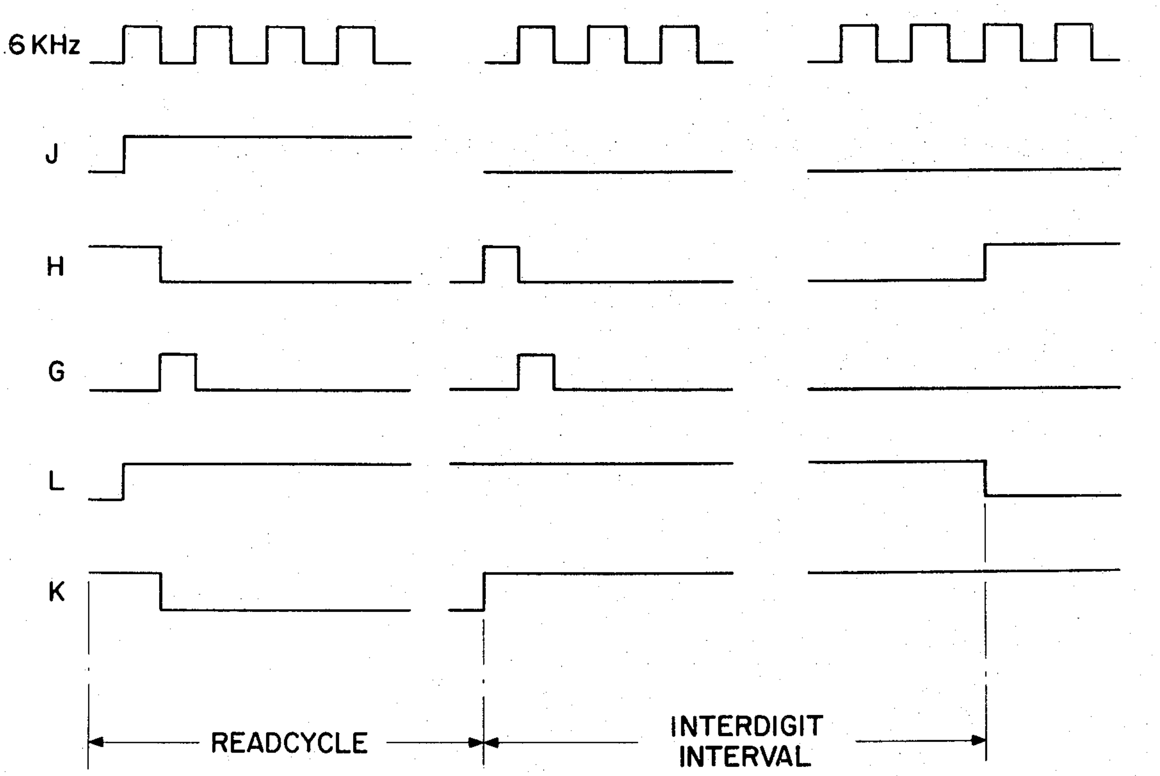

The operation of the output control block 38 during the read cycle may be more clearly understood with reference to FIG. 2 and the waveforms of FIG. 6. For convenience the waveforms of FIG. 6 have been alphabetically labelled to correspond to the terminals of the output control block 38 at which they appear. When a read signal (a high or logical 1 state) is applied to input terminal J of the output control block 38, output terminal L goes high to its logical one state, and one-half period later of the 1.6KHz clock, a positive pulse appears at output terminal G of said output control block 38 to load the presettable counter 28 from the memory 10. As soon as the presettable counter 28 is loaded, input terminal H and output terminal K of the output control block 38 go low (logical 0 state). With output terminal K in its logical 0 state, 10Hz pulses from the clock 40 pass through the second dual NOR gate 34 to the solid state switch 52.

After the digit dialled has been transmitted, the address stored in read register 12 is incremented by 1 as the signal at input terminal J drops to zero, and all four stages of the presettable counter are reset to zero with the result that input terminal H of the output control block 38 rises to its logical one state. The first occurrence (odd numbered occurrence) of logical one at the output terminal 44 of the four input NOR gate 30 generates a logical one signal at output terminal K which blocks the passage of further dial-pulse-timing signals through the second dual input NOR gate 34 to the solid state line switch 52. The aforementioned odd numbered occurrence of a logical 1 signal at output terminal K actuates the output selector 26 to allow the fixed binary word (1000) to appear before the presettable counter 28. One-half period of the 1.6KHz clock after K has gone high (logical one state) a positive pulse reappears at output terminal G of the output control block 38 which loads the presettable counter 28 with the fixed data word to begin the interdigit interval. When the presettable counter 28 has counted to binary 10,000 (the interdigit interval input terminal H rises to its logical one state (second or even numbered occurrence) to signal the end of the interdigit interval and output terminal L drops to its logical zero state to transmit another try-to-read signal to input terminal F of the read-write interlace block 36.

What is claimed is:

1. A telephone digit generator for generating dial pulses on a telephone line in response to a digit selected on a pushbutton pad at a telephone station set, said generator comprising:

a. a non-destructive read-write memory, b. a read address register and a write address register, c. means for coding and loading the digit selected on the pushbutton pad into said memory at an address stored in the write address register, d. a presettable counter arranged to receive data from said memory in response to a read signal, said counter having a plurality of counter stages, e. a read-write interlace means for generating a read signal, in response to a difference in the address stored in the read address register and the address stored in the write address register, when no digit is being selected on the pushbutton pad, f. a pulse generator for generating dial-pulse timing signals, g. means for generating a first enable signal in response to a difference in the state of at least one of the presettable counter stages, h. means responsive to every occurrence of the first enable signal for gating dial-pulse-timing signals into the presettable counter, i. dial pulse generating means responsive to dial-pulse-timing signals and to odd numbered occurrences of the first enable signal, for generating dial pulses on the telephone line, j. means, responsive to even numbered occurrences of the first enable signal, for loading a fixed data word into the presettable counter and for inhibiting the dial pulse generating means, whereby the digit selected is generated by interrupting telephone line current at the dial-pulse-timing signal rate as the dial-pulse-timing signals are fed into the presettable counter until all the presettable counter stages read the same state, and whereby the interdigit pause is provided by loading the presettable counter with a fixed data word to generate an even numbered occurrence of the first enable signal and gate dial-pulse-timing signals into the presettable counter until all of the presettable counter stages reach the same state.

2. The invention as defined in claim 1 wherein the means for generating the first enable signal is a logic gate having a plurality of inputs, each input of said logic gate being connected to monitor a corresponding counter stage of the presettable counter.

3. The invention as defined in claim 1 wherein the means for gating dial-pulse-timing signals into the presettable counter is a first dual input gate, one input of said gate being connected to the pulse generator and the other input of said gate being connected to receive the first enable signal.

4. The invention as defined in claim 1, wherein the dial pulse generating means includes a second dual input gate, one input of said gate being responsive to dial-pulse-timing signals and the other input of said gate being responsive to an enable signal derived from odd numbered occurrences of the first signal, the output of said dual input gate supplying a control signal for circuitry used to interrupt the telephone line current.

5. The invention as defined in claim 1 wherein the write address register and the read address register are counters, the sum in each counter corresponding to a particular location in said memory, and wherein after accessing said memory at the address stored in either the write address register of the read address register, the address stored in the last called register is automatically incremented.

6. The invention as defined in claim 1 wherein the dial-pulse-timing signals have a mark-to-space ratio compatible with central office receiving equipment designed for rotary mechanical dials.

7. The invention as defined in claim 1 wherein the fixed data word corresponds to a particular number, the time required for the presettable counter to count said particular number serving to measure the time aloted by the telephone digit generator for interdigit pauses.

8. The invention as defined in claim 1 wherein the digit selected is stored in said memory in Binary Coded Decimal form and wherein the inverse of the digit stored in said memory is loaded into the presettable counter if said counter is an up-counter.

9. The invention as defined in claim 1 wherein the means for generating the first enable signal is a logic gate having a plurality of inputs, each input of said logic gate being connected to monitor a corresponding counter stage of the presettable counter and wherein the means for gating dial-pulse-timing signals into the presettable counter is a first dual input gate, one input of said gate being connected to receive dial-pulse-timing signals from the pulse generator and the other input of said gate being connected to receive the first enable signal.

10. The invention as defined in claim 9 wherein said logic gate is at least a four input NOR gate and said first dual input gate is a dual input NOR gate.

11. The invention as defined in claim 1 wherein the read-write interlace means includes a comparator which compares the address stored in the read address register with the address stored in the write address register to determine whether all digits stored in said memory have been read and generated on the telephone line before generating a read signal, and wherein the trailing edge of the read signal is used to increment the address stored in the read address register.

12. A telephone digit generator for generating dial pulses on a telephone line in response to a digit selected on a pushbutton pad at a telephone station set, said generator comprising:

a. a non-desctructive read-write memory,
b. a read address register and a write address register,
c. means for coding and loading the digit selected on the pushbutton pad into said memory at an address stored in the write address register,
d. a presettable counter arranged to receive data from said memory, at an address stored in the read address register, in response to a load signal, said counter having a plurality of counter stages,
e. a pulse generator for generating dial-pulse-timing signals
f. means for generating a first enable signal in response to a difference in the state of at least one of the presettable counter stages
g. first means responsive to the first enable signal for gating dial-pulse-timing signals into the presettable counter and second means, responsive to the first enable signal, for generating a second enable signal,
h. third means, responsive to a difference in the address stored in the read address register and the address stored in the write address register, for generating a try-to-read signal,
i. a read-write interlace means for generating a read signal, in response to the try-to-read signal, when no digit is being selected on the pushbutton pad,
j. fourth means responsive to dial-pulse-timing signals and to the second enable signal, for generating dial pulses on the telephone line,
k. fifth means, responsive to the read signal for generating a load signal,
l. sixth means, responsive to every second occurrence of the first enable signal for inhibiting the second enable signal and for loading a fixed data word into the presettable counter, whereby to generate the digit selected, the telephone line current is interrupted under control of the dial-pulse-timing signals for the duration of the second enable signal and whereby following the end of the second enable signal, the interdigit pause is provided by loading the presettable counter with the fixed data word so as to generate another first enable signal and gate dial-pulse-timing signals into the presettable counter until all of the presettable counter stages reach the same state.

13. The invention as defined in claim 12 wherein the means for generating the first enable signal is a logic gate having a plurality of inputs, each input of said logic gate being connected to monitor a corresponding counter stage of the presettable counter and wherein the means for gating dial-pulse-timing signals into the presettable counter is a first dual input gate, one input of said gate being connected to receive dial-pulse-timing signals from the pulse generator and the other input of said gate being connected to receive the first enable signal.

14. The invention as defined in claim 12 wherein the read-write interlace means includes a comparator which compares the address stored in the read address register with the address stored in the write address register to determine whether all digits stored in said memory have been read and generated on the telephone line before generating a read signal, and wherein the trailing edge of the read signal is used to increment the address stored in the read address register.

* * * * *